United States Patent [19]
Maus

[11] Patent Number: 4,793,953
[45] Date of Patent: Dec. 27, 1988

[54] MOLD FOR OPTICAL THERMOPLASTIC HIGH-PRESSURE MOLDING

[75] Inventor: Steven M. Maus, Osseo, Minn.

[73] Assignee: Galic/Maus Ventures, Columbia Heights, Minn.

[21] Appl. No.: 109,228

[22] Filed: Oct. 16, 1987

[51] Int. Cl.$^4$ .......................................... B29D 11/00
[52] U.S. Cl. .................................... 264/2.5; 264/219; 425/256; 425/542; 425/808
[58] Field of Search ................. 425/256, 808, 542; 264/2.5, 1.3, 219, 225, 338, 337, 106, 297.8; 249/135

[56] References Cited

U.S. PATENT DOCUMENTS

| | | | |
|---|---|---|---|
| 2,292,917 | 8/1942 | Williams | 425/407 |
| 3,408,429 | 10/1968 | Wichterle | 425/808 X |
| 3,632,695 | 1/1972 | Howell | 425/808 X |
| 4,017,238 | 4/1977 | Robinson | 425/808 X |
| 4,095,772 | 6/1978 | Weber | 425/808 X |
| 4,116,753 | 9/1978 | Tojyo et al. | 249/135 X |
| 4,246,207 | 1/1981 | Spycher | 425/808 X |
| 4,364,878 | 12/1982 | Laliberte et al. | 264/2.2 |
| 4,434,113 | 2/1984 | Neefe | 264/2.5 X |
| 4,479,910 | 10/1984 | Kurokawa et al. | 264/2.5 |
| 4,573,903 | 3/1986 | Boudet et al. | 425/808 X |
| 4,664,854 | 5/1987 | Bakalar | 264/297.8 X |

FOREIGN PATENT DOCUMENTS

61-92452  5/1986  Japan ..................... 264/2.5

Primary Examiner—Richard L. Chiesa
Attorney, Agent, or Firm—Merchant, Gould, Smith, Edell, Welter & Schmidt

[57] ABSTRACT

An improved method and apparatus for high-pressure injection or compression molding of optical thermoplastic parts such as lenses or optical disks, wherein the optical surfaces of a molded part are formed by intimate contact with suitably contoured or profiled and lapped surfaces of one or more optical mold insert elements. The optical surface of such mold element is of a different composition metallurgically than is the bulk composition of the rest of the mold element, thus allowing for optimum selection for materials-of-construction parameters (such as heat transfer, load-bearing quality, and ease of fabrication) in the bulk properties of the substrate metal, without necessarily trading off against optimum optical surface characteristics (such as imperviousness to chemical oxidation or attack, resistance to scratching and abrasion, ease of generating optical surface therein). Thus, a one-piece construction (not mechanically joined from separate elements) of a seamless nature, generally consists of at least one layer of relatively thick electroplating (nickel or chromium) onto a beryllium-copper alloy substrate of certain specified mechanical and thermal characteristics. Heat transfer is further improved by means of machined flow channels provided for circulating liquid coolants. A most preferred mold element construction consists of, first, a machined beryllium-copper substrate onto which a thick watts nickel plating was deposited, followed by abrasive lapping to create the specified surface contour to a high level of microstructure perfection and smoothness, onto which a final thin hardcasting of either vacuum-deposited TiN or flash plate of chromium is deposited.

14 Claims, 3 Drawing Sheets

MOLD FOR OPTICAL THERMOPLASTIC HIGH-PRESSURE MOLDING

BACKGROUND OF THE INVENTION

1. Field of the Invention

The present invention is directed towards a method and apparatus for producing better molds for making precisely-contoured thermoplastic products of ectremely consistent surface profile and smoothness, in general. In particular, optical plastic products, such as vision-corrective lenses (implant interocular, contact lens, prescription spectacle lens, reading glasses, magnifier lens), and information storage optical disks (digital audio compact disks, video disks, interactive video disks, CD/ROM, and write-once or erasble computer memory storage disks), as well as any number of photographic and instrument lenses requiring precise magnification or demagnification are specifically included in the field of the present invention.

2. Description of the Related Technology

Optical plastic products are typically formed in one or more of the following ways:

(1) Low-pressure molding or casting processes in which typically a low-viscosity prepolymer or monomer mixture is polymerized while contained within a mold cavity;

(2) High-pressure molding or casting processes wherein the incoming plastic polymer is already of suitably high molecular weight and essentially complete structure and is heated to sufficient temperature to provide a flowable, viscous mass which can be formed into its ultimate configuration while being held under high pressures within a mold cavity, and cooled to an appropriately low temperature for solidification therein;

(3) Direct machining processes from a preformed shape or plastic stock material.

For either low-pressure casting or high-pressure molding processes, some of the requirements for the mold elements which form the optical surfaces of the final plastic product are the same; such part-forming optical mold elements must, of course, have precisely the desired contour or profile (including a shrinkage compensation factor therein) and an extremely smooth, highly polished microsurface (free of flaws and discontinuities). In addition to these optical quality requirements of the part-forming mold surfaces, which are requirements common to both low-pressure and high-pressure molding processes, there are additional special requirements for high-pressure thermoplastic molding:

(1) Much greater need for rigidity and dimensional stability because of the high pressures exerted within the mold cavity which quite commonly reach 5–10,000 PSI, and fast injection fill times which may take only 0.1–0.2 seconds, thus creating a shockwave in the mold cavity.

(2) Desirably high rates of heat transfer because inherent to high-pressure thermoplastic molding processes is the need in each molding cycle to remove large amounts of heat from the plastic as it goes from a temperature well above its melting point to a dimensionally stable temperature below its solidification point or glass-transition temperature point. Therefore, the part-forming mold elements commonly contain coolant-flow passages wherein suitable heat-transfer fluid is continuously circulated to assist in this function of rapid cooling.

(3) Desirably impervious mold surface resisting corrosion and scratching.

In addition, repairability and service life are considerations in the selection requirements for suitable part-forming optical mold elements.

Thus, some materials of construction and types of construction well suited for low-pressure molding and casting optical processes are unsuitable for high-pressure optical molding processes. For example, glass and certain ceramics are widely used in optical die construction for cast plastic lenses and sheets formed from cross-linking reactions (polymerizing the plastic while contained in such mold cavities via heat-initiated or radiation-initiated polymerization reactions). Glass and related ceramics are readily fabricated into almost any optical shape and surface of interest by very well known and established, relatively low-cost means. However, these glassy materials are not useful in high-pressure optical molding processes because they are heat insulators and relatively soft-surfaced, easily damaged materials of unsuitable mechanical properties.

Another class of optical mold materials widely used for low-pressure molding and casting processes include the electro-formed metals (usually nickel), which is produced from well-known die-replication processes off of a mirror image master or model piece. The heat-transfer rate of such electro-formed nickel mold surfaces is, of course, quite superior to glass, but these electro-formed mold elements are economically limited to relatively thin sections (30–150 mils) and, thus, are unsuited for high-pressure molding processes unless somehow assembled into a composite with a high-strength metal-backing material which usually also contains the coolant-flow channels. Combining such an optically acceptable part-forming surface element with such a reinforcing and cooling backing element is far from being a trivial challenge. First is the need to precisely mate the adjoining surfaces, to prevent stress concentrations and to provide a good interface for optimum heat transfer across that boundary. Also, since the nickel surface is of only moderate hardness and, thus, susceptible to scratches or other surface damage rendering the mold optically unsuitable without repair, some sort of provision for removing this surface element at a later time is required. The easier the replacement of such surface elements becomes, however, the more often compromised is the stability of the resulting composite assembly or its desirable heat-transfer rates.

For these reasons, high-pressure optical thermoplastic molding processes have, most commonly, employed monolithic metal (varying grades of tool steels, in particular) for materials of construction for the part-forming mold elements. These mold elements are fabricated in all the usual ways well known to the metalworking industry, including metal removal via milling, lathe turning, fly cutting, or spark erosion by electrical discharge. Once the nominal dimensions, shape or contour of the fabricated steel mold element have been attained, then the part-forming surfaces are abrasively lapped by successively finer abrasives in a manner well known to those skilled in the art until these contoured surfaces reach satisfactory degrees of smoothness and polish.

An anomaly in this mold fabrication process is that in the first stages of machining processes directed towards achieving nominal dimensions and contour, a relatively-soft, easily-worked material is desired (or required in some cases, such as single-point diamond turning—most tool steels cannot be fabricated in such a way, this fabricating technique thus limiting itself to relatively-softer materials). Yet, abrasive lapping and polishing operations favor relatively-harder materials. In particular, softer surfaces tend to develop an "orange peel" appearance and macro texture undesirable for optical surfaces.

The optical mold surfaces which form the part should desirably be of a material which is very hard (to resist scratching), chemically inert in its ordinary environment (to prevent rusting, oxidation or tarnish which renders the surface optically unacceptable), and of suitable metallurgical purity (of a highly regular and dense-grain structure-free of slag, impurities, voids, or other optically unacceptable microflaws).

So far, stainless steel of suitably-refined metallurgical purity grades has become the material of choice. Its resistance to mechanical deletion and load-bearing strength is very high, and generally its mechanical properties represent a useful balance between reasonably fast metal-removal machining rates and reasonable ease in lapping to a wrinkle-free optical surface polish. Its chemical inertness is well-known. Furthermore, at premium costs, stainless steel grates of high metallurgical purity can be obtained via ESR (electro-slag refining) or VIM-VAR (vacuum induction melting-vacuum arc remelt) processes. Its thermal conductivity is high when compared to glass or electroformed nickel composite mold elements, and these monolithic stainless steel mold elements can be readily fabricated (including coolant flow channels) via well-known techniques of machining and lapping.

However, certain deficiencies remain. Stainless steel is not the hardest nor most chemically inert of metal surfaces. Although it can be metallurgically purified to a great extent, it is still subject to random impurities and voids of an optically objectionable nature. Its heat transfer rates, while acceptable, are vastly lower than certain other soft metals such as copper, aluminum, or silver and gold. Also, successive cycles of surface damage and repair (via regrinding and repolishing) reduce the mold element nominal dimensions until eventually the resulting product is out of tolerance (such as by means of increased molded plastic part thickness because of successive mold resurfacing operations). For example, digital audio compact disk molded-part thickness tolerances are only + or − 0.004 inches.

There have been two previous attempts to combine, in a two-part assembly, metal materials of dissimilarly high and low thermal conductivities, to produce optical lens injection molds for thermoplastics. However, in both references the stated intention of this assembly is to compensate for the slower cooling rates (inherent in powered lenses) of the thicker parts of inherently nonuniform cross-section. Thus the associated construction of these assemblies shows that the junction of the dissimilar metal components follow their developer's concern for nonuniform heat distribution caused by the nonuniform lens cross-sectional thickness, rather than any concern for an unacceptably slow overall cooling rate.

Laliberte, in U.S. Pat. No. 4,364,878 (column 5, lines 9-30), discusses a two-piece mold insert assembly in passing.

Williams, in U.S. Pat. No. 2,292,917, discloses a two-piece mold insert assembly at much more length, first establishing that ". . . highly polished dies are usually formed of steel. . . " (page 1, lines 14-15), which are apparently his material of choice for mold dies 1 and 2, which actually are in contact with the molten plastic lens, and these dies in turn are joined (by mating surface contours) and backed by bodies 19 and 20 which are . . . "formed of a material, such as copper, of thermal conductivity considerably higher than that of the material of the dies" (page 3, lines 71-74).

SUMMARY OF THE INVENTION

Instead of a multi-piece assembly for the optical part-forming mold elements, the present invention provides the desirable base material properties (thermal and mechanical) of certain beryllium copper alloy (Be/Cu) with the desirable metallurgical surface properties of certain thick plating films of chrome or nickel.

In particular, the beryllium copper alloy is chosen for its desirably-high heat-transfer rate while still retaining mechanical properties similar to certain grades of tool steels. Machinability of such BeCu alloys is good to excellent, and it may be obtained in commercial sizes and shapes so as to permit the minimal use of rough-machining processes for many common optical-mold-element configurations and resulting in minimal material waste. Preferably, the BeCu alloy chosen should have a yield strength at 0.2% offset of at least 75,000 psi and a heat-transfer coefficient of at least 50 BTU/square foot/foot/degree Fahrenheit, and preferably be of a cold-rolled stock.

Following fabrication of the BeCu alloy to nominal dimensions, it is then thick-plated with at least 0.5 mil and as much as 15 mils, usually between 2-10 mils, and most preferably, 3-5 mils. The choice of thick-plating ranges from hard chrome to certain grades of Watts electrolytic nickel, certain formulations of electroless nickel phosphate, and certain electrolytic nickel sulfamate, the materials being listed in approximate order of increasing softness, and increasing ductility or reduced brittleness. Following such thick-plating operations, the part-forming mold element is then restored to the desired nominal dimensions and contour via machining and lapping operations, and then through successively finer abrasives, an optically polished surface is rendered. An important feature of the present invention is that the optical surface generated thereby is metallurgically that of the thick plated metal, which is deposited literally atom by atom and (provided care is taken to keep the bath pure) is of better purity and finer grain structure than that of the base metal substrate.

Subsequently, an optional but preferred application of thin vacuum deposited hardcoating (<0.1 mils) of Titanium Nitride or "flash" chromium plating (0.05-0.5 mils, typically 0.2-0.3 mils) over this original plating can further enhance the degree of surface hardness without significant form or profile-deviation (from non-uniformity of plating deposited thicknesses) of the optical part-forming surfaces.

Another advantage of mold elements of the present invention is that they can be reworked infinitely. Each time the surface is eroded to a point just prior to the removal of the last of the plating, or just after such lapping has broken through into the bright copper colored substrate, then it is replated with thick plating and the process is resumed as before.

DETAILED DESCRIPTION OF THE INVENTION

Figure 1:
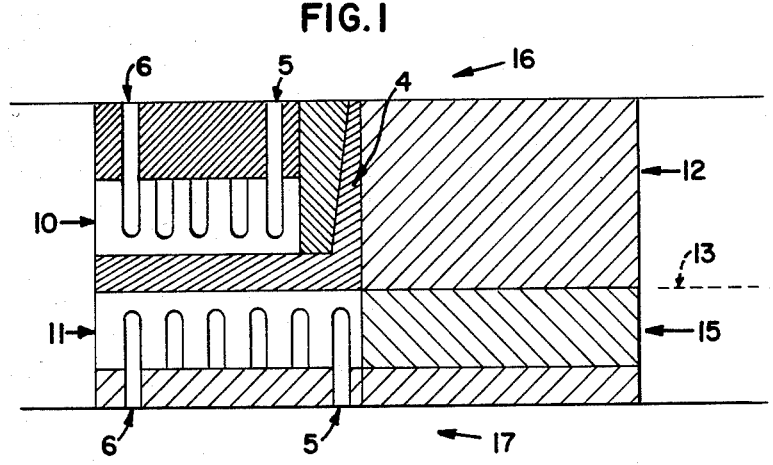
FIG. 1 is a sectional view of a high pressure mold for optical thermoplastics constructed according to the principles of the present invention.

FIG. 1 shows a sectional view of a typical high pressure mold 12 for optical thermoplastics, in this example, an optical disk moldset. Contained in an injection molding machine (not shown), the mold opens and closes at the parting line 13 (the first half 14 is mounted to the stationary platen 16, and the second half 15 is mounted to the movable platen 17). Molten thermoplastic is injected under pressure from the molding machine's nozzle (not shown) through sprue bushing (4) and into the mold cavity formed by mold inserts 10 and 11. Circulating heat transfer fluids (commonly water, water/glycol mixture, or oils) pass through inlet coolant riser (5) which is maintained in fluid communication with mold insert 10 and 11, following a predetermined pattern of machined channels which distribute the incoming heat-transfer fluid en route to its outlet coolant riser (6).

Figure 2A:
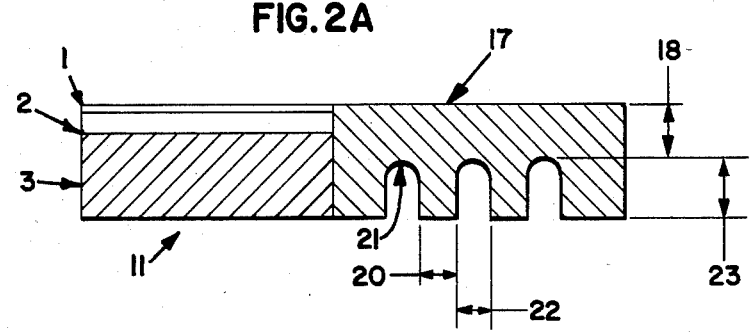
FIG. 2A is a sectional view of an optical disk mold insert as shown in FIG. 1.

FIG. 2A shows a sectional view of optical disk mold insert (11); the right-hand portion illustrates one possible embodiment, having a pattern of concentric coolant channels. This particular configuration shows the setback height 18, having a value of H, defined as the distance from the closest point within the coolant channels to a mold surface 19 wetted by the molten polymer. Another important dimension shown therein is the spacing 20 between adjacent channels 21, having a value of "A"; as is dimension 22, having a value of B, which is the width of said coolant channel 21 and dimension 23, having a value of C which is the height of said coolant channel 21.

Figure 2B:
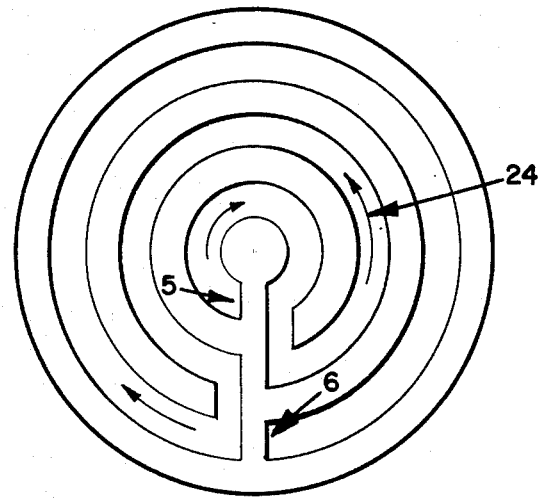
FIG. 2B is a plan view of the optical disk mold insert of FIG. 2A.

In this particular embodiment, an approximately spiral flow channel pattern was selected as it can be easily turned upon a lathe and plugged and milled forming walls or passageways thereto, shown in FIG. 2B, which is a bottom view of the mold insert 1 of FIG. 2A. In FIG. 2B, one can see the pattern of coolant flow by following the arrows 24. This particular pattern is said to be of approximately "square pitch," wherein dimension 21(A) and 22(B) are approximately equal.

Constructions of molding surfaces shown in FIGS. 2A and 2B of stainless steel would be well known. However, the present invention combines a plurality of materials into a one-piece construction which features greatly increased heat-transfer rates; significantly greater scratch and chemical resistance of the optical surface; equal or better than presently available optical surface profile, smoothness and polish; adequate mechanical integrity and load-bearing properties; yet at a modest increase in initial cost and lower overall life cycle costs due to the many rework cycles for damaged optical surfaces which can be accomplished.

This monolithic construction is shown in the left-hand portion of the sectional view of FIG. 2A. This construction starts with a substrate (3) of selected grades of beryllium copper. The first requirement for any optical mold or other precisely dimensioned or contoured molded part would be to provide adequate mechanical integrity in the mold elements which constructively form the mold cavity, including especially mold inserts 10 and 11 as shown in FIG. 1. These materials must be dimensionally stable in spite of hundreds of thousands of molding cycles, each of which involves hundreds of degrees of temperature change and thousands of pounds per square inch of internal melt pressures. Such high-pressure injection or compression molding processes have long proven the suitability of such tool-steel grades as AISI-type P20 and 420 grades of stainless steel. A critical property which is useful for predicting such long-term dimensional stability and resistance to fatigue and deformation is the yield strength at 0.2% offset, which is approximately 125,000 psi for P20, and 175,000 for 420 stainless steel.

Therefore, alternative alloys for mold insert 10 construction must provide equivalent or better load bearing capacity. This can be accomplished partly by increasing the dimensions of the load-bearing elements of the construction, when viewed from a finite-element analysis point-of-view. Such critical dimensions for a mold insert as pictured in FIG. 2A would specifically include offset height 18 and channel spacing 20. If a beryllium copper alloy, for example, was selected which had only one-half the yield strength of the steels, then a change in design should at least double the offset height 18 and channel spacing 20, to offer equivalent load bearing. In practice, however, such excessive deviation from the load bearing capacity of tool steel is neither desired nor necessary; one can see that if such a change has to be accommodated, the resulting cross-sectional size and occluded volume which is the necessary result of such a design change becomes undesirably large and works directly against the goal of improved heat transfer.

Therefore, in a preferred embodiment of the present invention, the beryllium copper alloy is selected from a stock having a minimum yield strength of at least 75,000 psi and, more preferably, in the range of 100,000–165,000 psi.

Since improved heat transfer is the primary benefit of the present invention, the next criteria for material selection is heat transfer. The coefficient of thermal conductivity for various candidate metal is given below in Table 1:

TABLE 1

| Alloy | Thermal Conductivity (at Room Temperature) |
| --- | --- |
| 420 Stainless Steel | 12 |
| P20 Tool Steel | 21 |
| Beryllium Copper | 60–110 |

The above conductivity values have dimensions of BTU/square foot/foot/degree Fahrenheit.

In practice, the most highly conductive alloys of BeCu are also the ones with softest load-bearing character, so a compromise must be made. A particularly preferred and widely commercially available alloy is the cold-rolled HT grade of alloy 25 from Brush-Wellman (Cleveland, Ohio), which balances high-yield strength with fairly high heat transfer.

This optimum BeCu alloy now can be readily machined in any of the conventional fashions so as to achieve the nominal dimensions desired of mold insert 10. Initially, the optical mold surface of insert 10 should be finished to a slightly dull matte surface of very fine microstructure. Highly polished surfaces are not desired since plating adhesion is poorer, and the thicker the plating, the greater the resultant adhesion problem would be. The tiny micro-texture is desired to provide anchoring points, mechanically, for the subsequent plating.

Thus, the BeCu alloy described above is the substrate 3 for a thick-plated layer 2 of electrolytic metal to be lapped and polished, and is not flash plated over final-polished Be/Cu.

The application of thin, hard metal films by electroplating is a well-known art employed to improve the corrosion resistance, scratch and wear resistance, and improve the appearance of compatible base-metal substrates. Such flash-plating, as it is known, most commonly employs electrolytic chrome or nickel baths and deposits film thicknesses of between 0.00001 and 0.005 inch (or 0.01–0.5 mils), and most typically, between 0.1–0.3 mils thickness. Such flash-plate chrome or nickel films can be applied even to very highly polished metal surfaces with acceptable adhesion and without measurably changing surface contour or micro-profile, or bringing nominal dimensions to an out-of-tolerance condition. Thicker platings of these same chrome or nickel films are proportionately more problematic for adhesion, uniformity, and purity of deposition, and distortion of profile or contour, so they are much less commonly used in precision metal tooling, for instance.

Surprisingly, the desirable combination of suitably polished beryllium copper alloy molding surface substrate with a flash-plate thin film deposition of nickel or chrome does not work. Attempts to render desirable grades of these alloys into a suitably highly polished surface have always been unsuccessful, even though all the well-known lapping techniques have been tried. The surfaces always still exhibit an unacceptable degree of macro-texture known to the trade as "orange peel." Even the best of the surfaces, as initially rendered, seem to further acquire a degree of grain or micro-texture after being run extensively in high-pressure molding presses, which are, of course, the intended use of the present invention. These observations of unsuccessful attempts to employ highly polished BeCu alloy in combination with flash-plated chrome are discussed more in the following paragraphs.

The thick-film plating layer 2 can optionally consist of hard chrome or several nickels. Hard chrome may seem most desirable, since it is able to give maximum surface hardness (Rc Rockwell hardness as high as 60–80), but it also is most prone to nonuniformity of deposition film thickness. Farady's Law predicts greatest deposition at the shortest path distance from cathode to anode. Almost all optical surfaces (or other precision-generated lapped surfaces) are surfaces of revolution or planarity, so there are inherent difficulties in providing exactly the same uniform thickness, especially near or at the edges or corners of the workpiece.

Electroless nickel, by contrast, has the least tendency towards such nonuniformity of deposition, but has increasingly greater difficulties in obtaining a pit or void free deposition. The thicker the deposition, the greater the difficulty in obtaining a uniform thickness. The pitting problem appears related to generation of hydrogen gas as a by-product of this plating process. Also, these nickel phosphate films can be formulated to produce baths of considerable hardness (Rockwell C>60) or great ductility (40–50).

Another alternative is electrolytic nickel, of the sulfamide or Watts nickel variety, well-known in the art. The former is properly used for electro-forming and deposits very quickly a thick film of high metallurgical purity, but tends to be related to softer, more ductile coatings. The latter can be used at hardnesses of the desirable 50–65 Rc range but is problematical to apply in high film thicknesses without being susceptible to impurities such as nodules or black specks.

Following deposition of at least 0.5 mils and as much as 15 mils, usually between 2–10 mils, and most preferably, 3–5 mils, some deviation from nominal surface profile and contour inevitably occurs and, thus, the first step is to restore this surface profile by means of abrasive grinding or lapping. Next, successively finer application of abrasive is made in successive lapping steps, each of which reduces the peak-to-valley surface roughness. Finally, a completely polished state is arrived at by means of a conformal pad of controlled resiliency being placed on the lap and by use of a loose abrasive slurry of submicron diamond or alumina dispersed in water or oil carrier, as is well known to the polishing art.

At this stage, the original plated film thickness has been reduced by typically 0.5–2.0 mils, depending upon original degree of nonuniformity in deposition. The greater the nonuniformity, the greater the removed film thickness necessary to bring the surface back to a common uniform nominal profile. In addition, should a metallurgical flaw be found upon polishing, more than one such iteration of successive grinding and lapping steps may be required; each such subsequent iteration causes a further reduction in plating thickness, of course. That is why optimal plating should be more than 1 or 2 mils thick originally, so as to provide for more than one chance at generating a suitable optically polished surface. Yet, it has been observed that excessive thickness (>6 mils) of the desirably hard (Rc>45) thick plating layer 2 are more prone to cracking or delamination after prolonged running in the high pressure thermoplastic molding processes. Perhaps that is because these harder platings are increasingly stressed by more thickness, when cycled repeatedly with the molding's temperatures and pressures, as mentioned before.

Another factor in choosing optimum plating thickness is that, in its intended molding uses, there eventually will occur some degrees of optical mold surface damage, such as scratches or digs, which need to be buffed back out by means of relapping with a fine-grind abrasive and then repolished. Each of these repair and re-work iterations, of course, further reduce the remaining plating film thickness, and if enough successive cycles of such repair are conducted, eventually these grinding and lapping operations break through the plating into the substrate material below. At that point, it is necessary to strip the remaining plating and then re-plate as with the original fabrication process, to the desirable 0.003–0.005 thickness. In this manner, a mold insert can sustain normal levels of surface damage and yet have an infinitely long life by successive re-lapping and re-plating operations. By contrast, this is not the case for the well-known and commonly-employed polished stainless steel mold inserts, which actually are discarded once their original height is no longer within acceptable tolerances after successive re-grinding and re-lapping repair operations.

In the case where a nickel thick-film plating layer 2 was chosen for its desirable balance of hardness versus ductility, a further optional final step to be performed upon the finely lapped and polished nickel-plated insert would be to provide a very thin hard coating 1 of either Titanium Nitride by vacuum deposition (typically applied <0.1 mil) by commercial coating services such as Multi-Arc Vacuum Systems (St. Paul, Minn.), or chrome flash plate (typically 0.1–0.3 mil, most often 0.2) to further enhance its resistance to surface scratching.

EXAMPLE I

An optical disk mold insert of the design and configuration similar to that shown in FIG. 2 was fabricated first from 420 stainless steel (as a comparative example) and, second, from Brush-Wellman BeCu Alloy #25. A Strasbaugh Model 6AD (R. Howard Strasbaugh Inc., Huntington Beach, Calif.) with counterweight head was used for abrasive lapping and polishing operations in a manner well known in the art. Lapping with diamond abrasive quickly reduced all substrate materials to a planar, flat surface of "light gray" matte estimated to be in the 3-5 micron range. Using commercially prepared aqueous polishing slurries and a variety of commercially available polishing pads of varying degrees of resiliency and conformity, we attempted to bring the mold inserts to an optical polish of high gloss and surface smoothness. However, whereas the stainless steel polished substantially free of orange peel or micro-texture, the various candidate beryllium alloys produced in each case unacceptable degrees of "orange peel" micro-texture, many of which were far worse than the best, but still all were unacceptable.

Therefore, the BeCu pieces were re-worked back to the fine-grind step, to a dull surface of some microroughness deliberately generated in order to provide improved anchoring of the thick-film plating. Watt's nickel plating of approximately 4.5 mils thickness was applied by a commercial plating company and the original surface profile was restored by subsequent grinding and lapping operations which removed approximately 1.0 mil of material. At this point, the disk mold insert had a highly polished surface entirely free of orange peel and, in general, a more optically perfect surface than even the stainless steel surface insert, based upon the mirror-like reflections and based upon close visual inspection by means of an 8-power magnifying loupe eyepiece. This plated beryllium insert now had approximately 3.5 mils of plating remaining, over which was applied a flash-plating chrome of approximately 0.2 mils thickness.

At this point, experimental runs were made in our optical disk mold of first the beryllium and second the stainless steel insert. For any given molding setup consisting of a certain incoming melt temperature of the plastic and a certain mold temperature maintained by circulating water coolant, the beryllium insert always provided significantly faster cooling times and shorter resulting overall mold cycle times, thus enhancing substantially the overall productivity of the molding operation.

Figure 3:
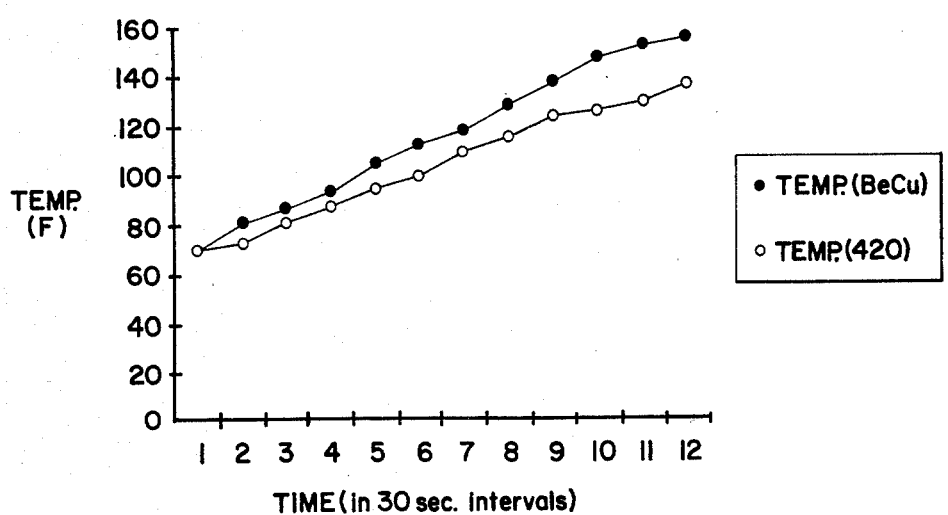
FIG. 3 is a plot of data from Example 1.

To quantify precisely the faster heat transfer rates of the beryllium-copper alloy mold insert of the configuration shown in FIG. 2 for optical disks versus the 420 stainless steel mold insert of the same configuration, the following test was run. First, a common laboratory hot plate (Markson's Spinmark II) was pre-warmed for 6.0 minutes. The backside surface of the respective mold insert was then laid onto the flat surface of the hot plate at Time=0, and the increase in temperature versus time was recorded as shown on FIG. 3 for both mold insert constructions. Temperature was read with a surface contact pyrometer with digital readout and the data plotted on FIG. 3. The data supports the previous empirical observation of faster mold coolant and heat transfer for the beryllium-copper-alloy-based mold inserts of the present invention.

In addition to the primary benefit of improved cooling rates and resulting faster mold cycle times, the plated beryllium inserts were found to resist light surface scratching better than the stainless steel insert. Both insert surfaces were rubbed by hand with type "0000" steel wool and buffed with Simi-Chrome, a commonly used commercial mold-cleaning polish. So, as previously mentioned, whereas the stainless steel insert can only be repaired and reworked through successive grind and lapping operations before it becomes out of tolerance dimensionally and must be discarded, the thick-plated BeCu insert can have essentially infinitely long service life with successive re-plating cycles as needed.

Although the present invention is described and illustrated herein by reference to a preferred embodiment of the invention, it will be understood that various modifications, substitutions and alterations may be made without departing from the spirit of the invention. Accordingly, the present invention is defined by the following claims.

I claim:

1. A special mold cavity member for use in high-pressure injection and compression molds for forming optical thermoplastic parts wherein the parts are formed by intimate contact under high pressure within the mold cavity comprising:
   (a) at least one optically-lapped surface composed of an electroplated nickel, said lapped surface facing into said mold cavity so as to permit incoming molten thermoplastic to wet said surface during filling of the cavity so as to form the part during pressurization of the molten thermoplastic in the mold cavity, and thus to replicate the lapped surface in the resulting thermoplastic optical parts; and
   (b) a suitably dimensioned, load-bearing substrate component of the mold cavity member, wherein the substrate component is of a beryllium-copper alloy composition, and the resulting mold cavity member is of a seamless, monolithic construction, consisting of a beryllium-copper substrate integrally joined with a nickel plated face.

2. The mold cavity member of claim 1 wherein the mold cavity member is formed so as to have a rear portion, the rear portion being opposite the optically-lapped surface facing inwardly to the mold cavity, the rear portion containing passageways for the circulating flow of liquid coolant such that said mold cavity member thus defined functions to provide superior heat transfer characteristics and a relatively long lived and comparatively impervious optical surface.

3. The mold cavity member of claim 1 wherein the electroplated nickel surface is originally deposited in thicknesses of between 0.001-0.015 inch, and is subsequently abrasively lapped to generate an optical surface with a lesser final thickness of nickel plate than the thickness of the originally deposited nickel surface.

4. The mold cavity member of claim 1 wherein the beryllium-copper alloy has load-bearing characteristics of at least 75,000 PSI yield strength and a thermal conductivity of at least 60 BTU/square foot/foot/degree Faherenheit.

5. The mold cavity member of claim 1 wherein one optically-lapped surface is composed of chromium.

6. The mold cavity member of claim 1 wherein the molding surface is formed as a flash chrome optical surface of flash chromium deposited over a thicker optically lapped nickel plate previously deposited onto a beryllium substrate.

7. The mold cavity of claim 6 wherein the molding surface is composed of titanium nitride instead of flash chrome plate.

8. A method of forming a special mold cavity surface for use in high-pressure injection and compression molds for optical thermoplastic parts wherein the optical surfaces of said thermoplastic parts are formed by intimate contact under high pressure with certain elements of the mold cavity, comprising the steps of:

(a) depositing a nickel surface through electroplating or electroless deposition onto a suitably dimensioned, load-bearing substrate component of the mold element, the substrate being of a beryllium-copper alloy, and (b) lapping optically said deposited nickel surface composed of an electroplated or electroless nickel, the lapped surface facing into the mold cavity so as to permit the incoming molten thermoplastic to wet the surface during filling so as to form the part during pressurization of the molten thermoplastic in the mold cavity, and thus to replicate the lapped surface in the resulting thermoplastic optical part, and the resulting mold element being of a seamless, monolithic construction, including a beryllium-copper substrate integrally joined with a nickel plated face.

9. The method of making the mold cavity surface of claim 8 wherein the mold element's back surface, which is opposite to the optically-lapped surface facing inwardly into the mold cavity, contains passageways for the circulating flow of liquid coolant, such that the mold element thus defined functions to provide superior heat transfer characteristics and a relatively long lived and comparatively impervious optical surface.

10. A method of making a mold cavity surface according to claim 8 wherein the electroplated nickel surface is deposited in thickness of between 0.001–0.010 inch, and is subsequently abrasively lapped to generate an optical surface with a final thickness of nickel plate less than the thickness originally deposited.

11. A method of making the mold cavity surface of claim 8 wherein the beryllium-copper alloy has load-bearing characteristics of at least 75,000 PSI yield strength and a thermal conductivity of at least 60 BTU/square foot/foot/degree Fahrenheit.

12. A method of making a mold cavity according to claim 8 wherein one optically lapped surface is composed of chromium.

13. A method of making a mold cavity surface according to claim 8 wherein the surface is composed of titanium nitride deposited over the optically lapped electrodeposited nickel.

14. A method of making a mold cavity surface according to claim 8 wherein the surface is composed of flash chrome plating deposited over the optically lapped electrodeposited nickel.

* * * * *